United States Patent [19]

Onose et al.

[11] 4,432,020

[45] Feb. 14, 1984

[54] ADMINISTRATION DATA STORAGE IN A FACSIMILE SYSTEM

[75] Inventors: Yasuichi Onose, Sakurai; Takashi Nakajiri, Nara; Takeo Tsumura, Matsubara, all of Japan

[73] Assignee: Sharp Kabushiki Kaisha, Osaka, Japan

[21] Appl. No.: 343,380

[22] Filed: Jan. 27, 1982

[30] Foreign Application Priority Data

Jan. 27, 1981 [JP] Japan .................................. 56-11133
Jan. 27, 1981 [JP] Japan .................................. 56-11136

[51] Int. Cl.³ ............................................. H04N 1/32
[52] U.S. Cl. .................................................. 358/257
[58] Field of Search ......................................... 358/257

[56] References Cited

U.S. PATENT DOCUMENTS 4,249,216 2/1981 Kanda ................................ 358/257
4,353,097 10/1982 Takeda .............................. 358/257

Primary Examiner—Howard Britton
Attorney, Agent, or Firm—Birch, Stewart, Kolasch & Birch

[57] ABSTRACT

A facsimile device includes an administration data storage system for memorizing the administration data related to each transmission operation. The data may comprise time data at which the transmission operation is initiated, time period data during which the transmission operation is conducted, document size data representing the size of the document sheet, sheet number data representing the number of document sheets, machine number data representing the machine number of the connected office, and operator code data representing the operator who conducted the transmission operation. The thus stored administration data is printed out at the end of each one day of work.

10 Claims, 19 Drawing Figures

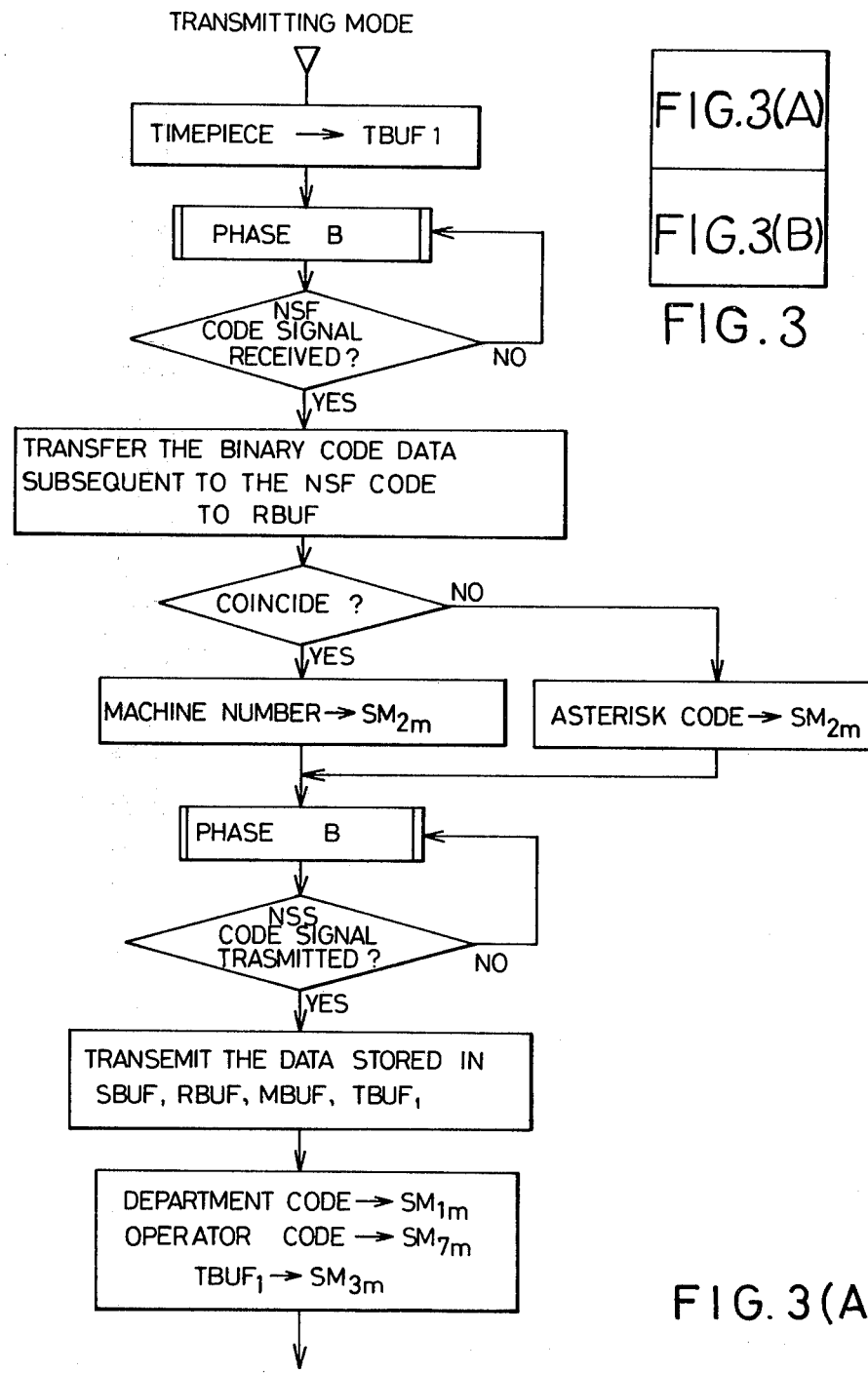

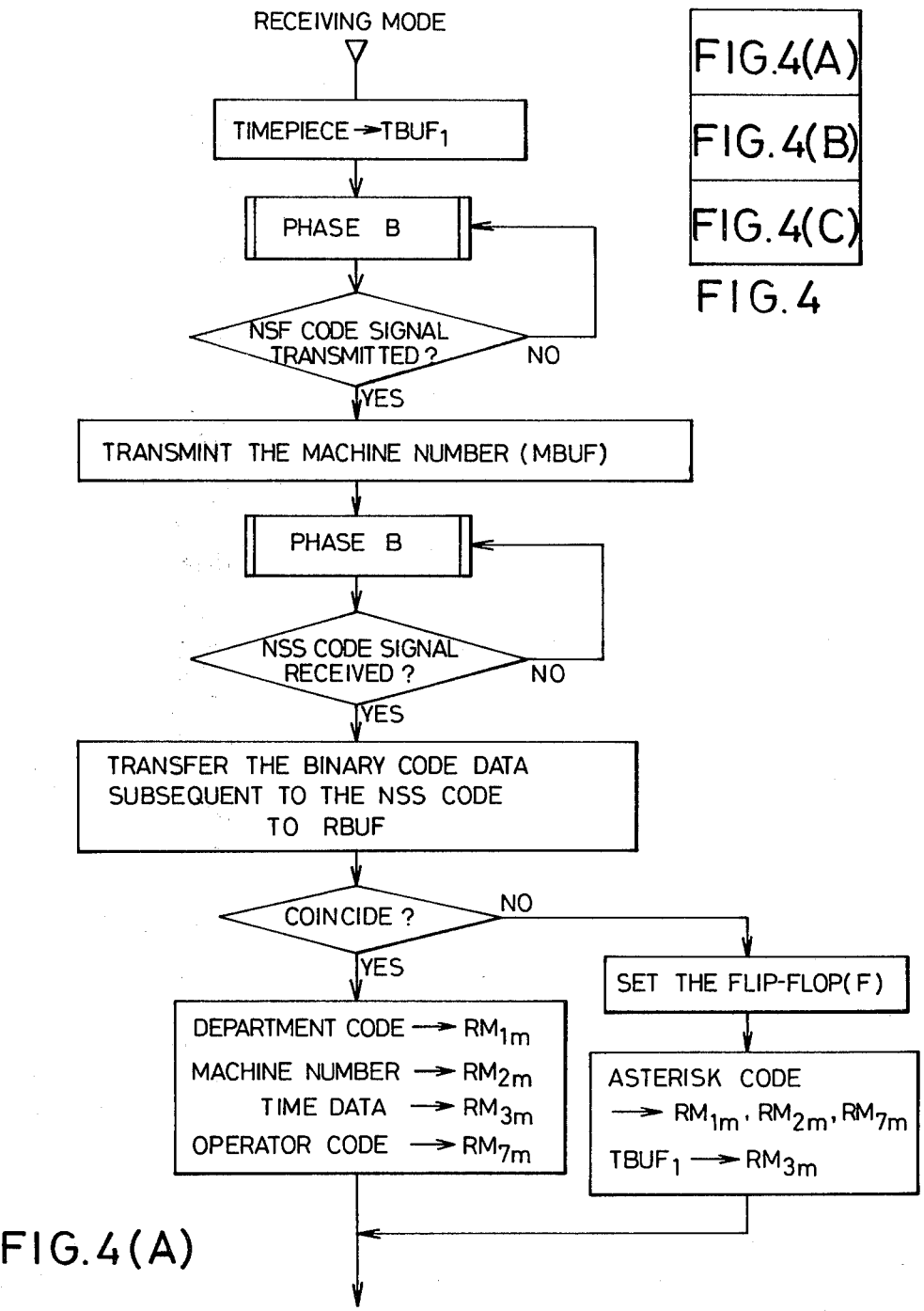

ADMINISTRATION DATA STORAGE IN A FACSIMILE SYSTEM

BACKGROUND AND SUMMARY OF THE INVENTION

The present invention relates to a facsimile system and, more particularly, to an administration data storage and record system in a facsimile device.

Generally, in a facsimile system, documents are first placed on the facsimile device, and a desired receiving office is called up through a telephone. The image information is modulated and transferred from the transmitting office to the receiving office. The transferred image information is demodulated at the receiving office and recorded on a recording paper.

In the conventional facsimile system, the administration information such as the transmission time, the name of the receiving office and the name of the transmitting office is manually recorded by the operator. It would be very convenient if the administration information could be automatically recorded by the facsimile system.

Accordingly, an object of the present invention is to provide a facsimile system which memorizes the administration information.

Another object of the present invention is to provide a facsimile device which prints out the administration information stored in the facsimile device.

Still another object of the present invention is to provide a facsimile system which transmits the administration information in addition to the image information.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a memory system is provided in a facsimile device to store the administration information such as the transmission time, the name of the receiving office and the name of the transmitting office. The thus stored administration information is printed out at a desired time through the use of a recording device included in the facsimile device.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 3, including FIGS. 3A and 3B is a flow chart for explaining the operation of the facsimile system of FIG. 1 in a transmitting mode;

FIG. 4, including FIGS. 4A, 4B and 4C is a flow chart for explaining an operation of the facsimile system of FIG. 1 in a receiving mode;

FIG. 7, including

FIG. 8, including

DESCRIPTION OF THE PREFERRED EMBODIMENTS

Figure 1:
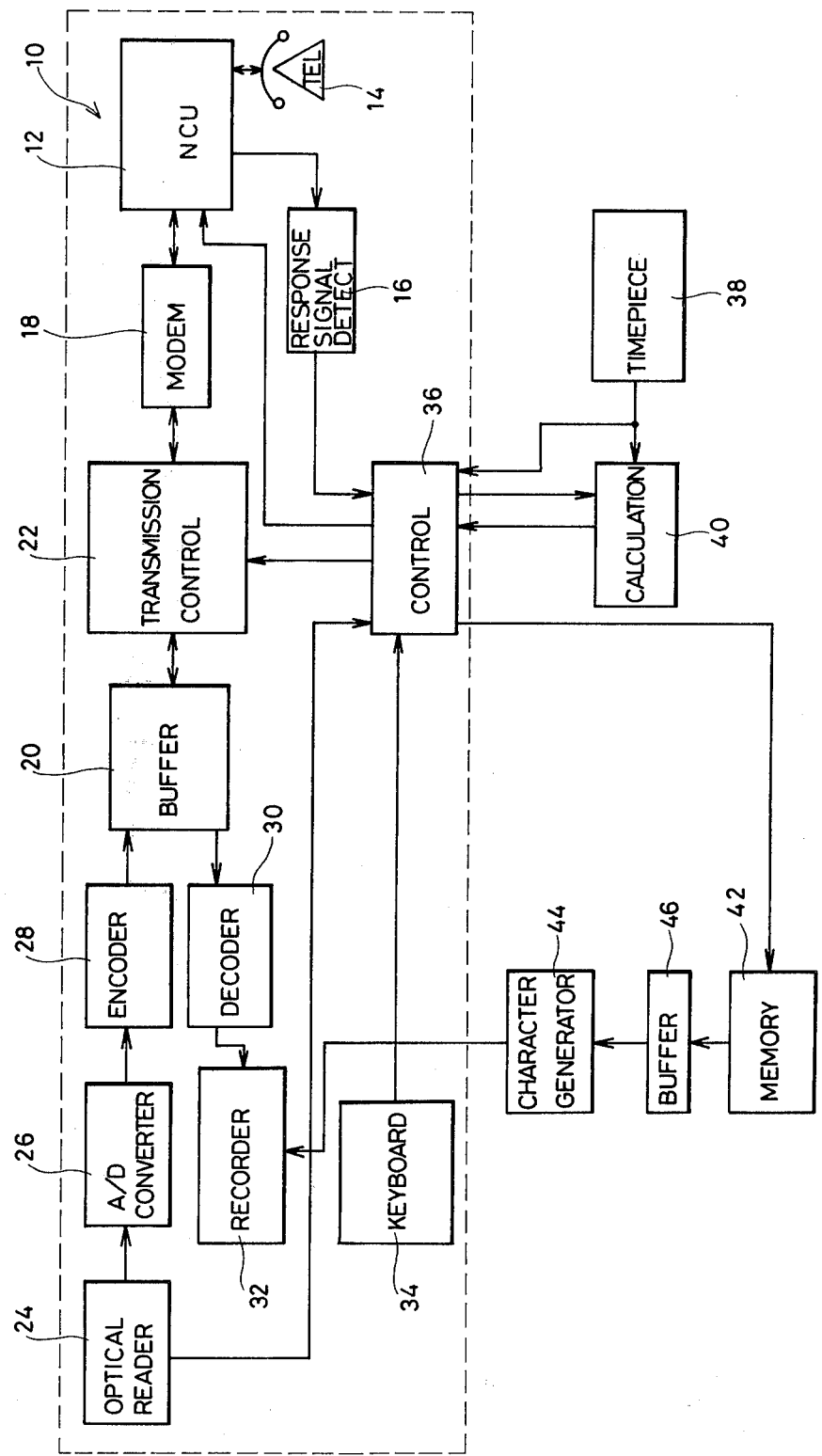
FIG. 1 is a schematic block diagram of an embodiment of a facsimile system of the present invention.

FIG. 1 schematically shows an embodiment of a facsimile system of the present invention. Generally, the facsimile system includes a main body 10 which comprises a network control unit (NCU) 12 as is well known in the art. The network control unit (NCU) 12 is connected to a public telephone circuit which is responsive to a telephone 14. To transmit the documents, a desired receiving office is first called up through the use of the telephone 14. A response signal is sent from the receiving office, which is detected by a response signal detection circuit 16, whereby the transmitting office and the receiving office are connected with each other via a modem (modulator/demodulator) 18. The modem 18 functions, in the transmitting mode, to modulate the digital signal representing the image information into an analog signal to be sent to the receiving office, and, in the receiving mode, to demodulate the received analog signal into a digital signal suited for recording.

The modem 18 is connected to a buffer memory 20 via a transmission control circuit 22. The buffer memory 20 functions to temporarily store the demodulated digital data derived from the modem 18 in the receiving mode in response to the selection operation conducted by the transmission control circuit 22. Further, the buffer memory 20 functions to temporarily store the digital image data to be sent to the receiving office in the transmitting mode in response to the selection operation conducted by the transmission control circuit 22. More specifically, in the transmitting mode, the documents are read by an optical reader system 24. The thus obtained image information is converted into a digital data by an analog-to-digital converter 26, and further treated by an encoder 28 to obtain a coded signal representing the image of the documents.

The demodulated digital data derived from the modem 18 and temporarily stored in the buffer memory 20 in the receiving mode is applied to a decoder 30 and then applied to a recording device 32 such as an electrostatic recording device to depict the transmitted image on a record receiving paper.

The facsimile system further includes a keyboard panel 34 having a transmission button, a receiving button and an automatic receiving switch as is well known. The keyboard panel 34 further includes, in accordance with the present invention, a time set key, a machine number set key, a department identifying key, an operator identifying key, numeral keys and a print instruction key.

A control circuit 36 controls the system operation. The facsimile system of the present invention further includes a timepiece 38 and a calculation circuit 40 for calculating the time period required for the data transmission, the number of the record receiving paper and the number of the sheets of the documents being sent. A memory system 42 is provided for storing the administration information. The timepiece 38 and the memory system 42 are connected to receive the power supply from a battery when the main power supply is interrupted. The administration information such as the transmission time, the name of the receiving office and the name of the transmitting office stored in the memory system 42 is read out in response to an actuation of the print instruction key included in the keyboard panel 34. The thus read out administration information is applied to a character generator 44 via a buffer memory 46. The character generator 44 develops a character signal representing the administration information stored in the memory system 42. The character signal is applied to the recording device 32 to print out the administration information in a dot matrix fashion such as in the 5×7 dot matrix. That is, the recording device 32 functions not only to record the documents transmitted from the transmitting office but also to print out the administration information stored in the memory system 42.

Figure 2:
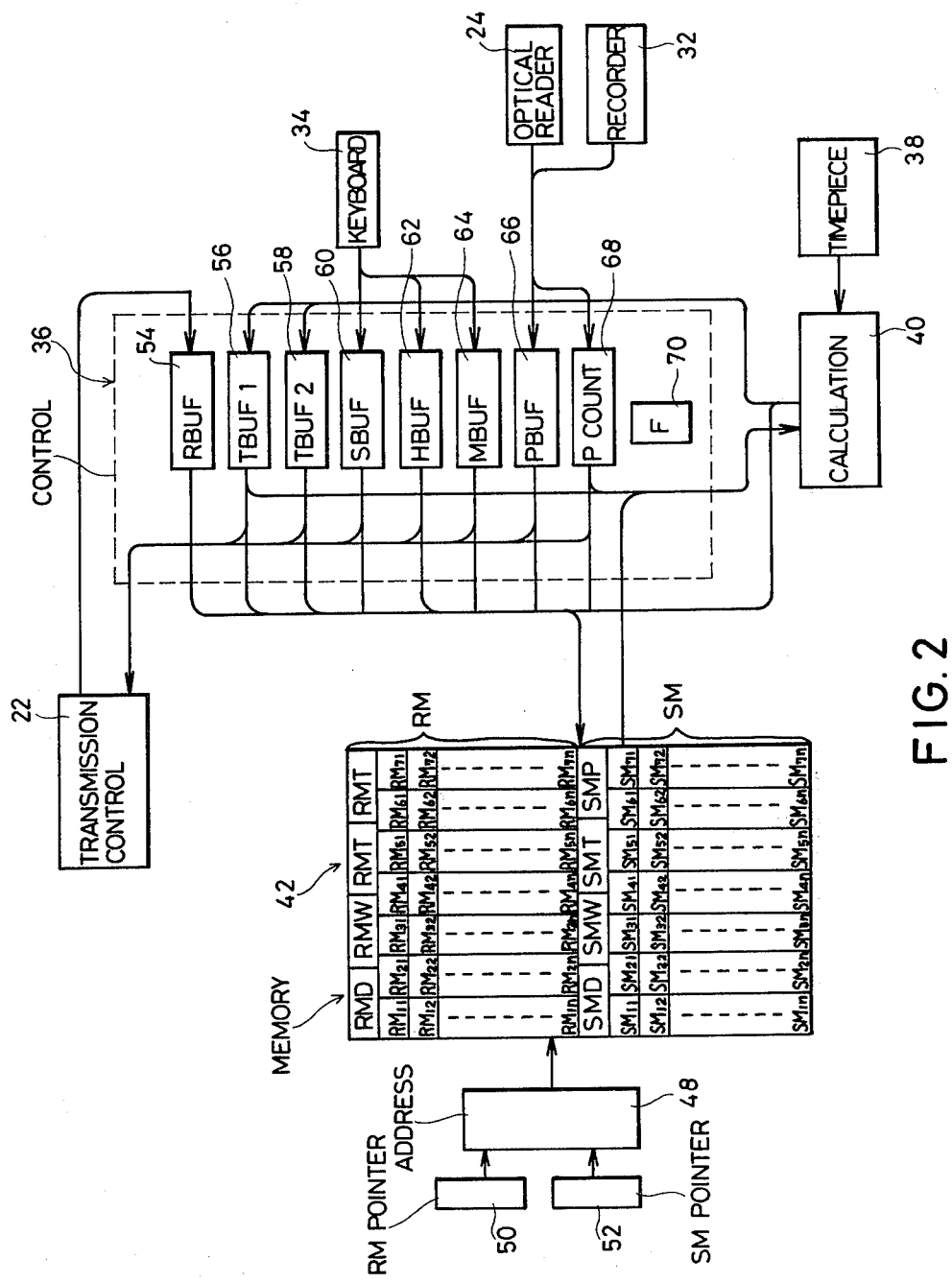
FIG. 2 is a block diagram of an essential part of the facsimile system of FIG. 1.

FIG. 2 shows the control circuit 36 and the memory system 42 of FIG. 1 in detail. Like elements corresponding to those of FIG. 1 are indicated by like numerals.

The memory system 42 is divided into two sections, one for storing the administration information regarding the receiving mode and the other for storing the administration information regarding the transmitting mode, which are referred to as a receiving mode memory (RM) and a transmitting mode memory (SM), respectively. Each of the memory sections RM and SM includes a memory area RMD (SMD) for storing the date information, a memory area RMW (SMW) for storing the day information, a memory area RMT (SMT) for storing and accumulating the time period required for the image data transmission, and another memory area RMP (SMP) for storing the total number information of the sheets of the recording paper being used and the documents being sent, respectively. Each of the memory sections RM and SM further includes a plurality of memory areas for storing the administration information of each of the transmissions. More specifically, the memory section RM includes memory areas $RM_{11}$ through $RM_{1n}$ for storing the information related to the department code of the transmitting office, memory areas $RM_{21}$ through $RM_{2n}$ for storing the information related to the machine number code of the transmitting office, memory areas $RM_{31}$ through $RM_{3n}$ for storing the information related to the time of the receiving operation, memory areas $RM_{41}$ through $RM_{4n}$ for storing the information related to the time period required for the receiving operation, memory areas $RM_{51}$ through $RM_{5n}$ for storing the information related the size of the record receiving paper, memory areas $RM_{61}$ through $RM_{6n}$ for storing the information related to the number of sheets of the record receiving paper being used, and memory areas $RM_{71}$ through $RM_{7n}$ for storing the information related to the operator code.

Similarly, the memory section SM includes memory areas $SM_{11}$ through $SM_{1n}$ for storing the information related to the department code of the receiving office, memory areas $SM_{21}$ through $SM_{2n}$ for storing the information related to the machine number code of the receiving office, memory areas $SM_{32}$ through $SM_{3n}$ for storing the information related to the time of the transmitting operation, memory areas $SM_{41}$ through $SM_{4n}$ for storing the information related to the time period required for the transmitting operation, memory areas $SM_{51}$ through $SM_{5n}$ for storing the information related to the document size, memory areas $SM_{61}$ through $SM_{6n}$ for storing the information related to the number of sheets of the documents being sent, and memory sections $SM_{71}$ through $SM_{7n}$ for storing the information related to the operator code.

The memory areas in the memory sections RM and SM are addressed by an address circuit 48 which is controlled by an RM pointer 50 and an SM pointer 52. In the receiving mode, a specific row of each of the memory areas in the memory section RM is addressed by the address circuit 48. When the receiving operation is completed, the contents stored in the RM pointer 50 are increased by one. In the transmitting mode, a specific row of each of the memory areas in the memory section SM is selected by the address circuit 48. When the transmitting operation is completed, the contents stored in the SM pointer 52 are increased by one.

The control circuit 36 includes a buffer memory (RBUF) 54 for temporarily storing the control signal (binary data) sent from the transmitting office, a buffer memory (TBUF$_1$) 56 for temporarily storing the time at which the transmitting operation or the receiving operation is initiated, a buffer memory (TBUF$_2$) 58 for temporarily storing the information related to the time period required for the receiving operation or the transmitting operation, a buffer memory (SBUF) 60 for storing the department code which has been preset through the use of the keyboard panel 34, a buffer memory (HBUF) 62 for storing the operator code which has been preset through the use of the keyboard panel 34, a buffer memory (MBUF) 64 for storing the machine number information which has also been preset through the keyboard panel 34, a buffer memory (PBUF) 66 for temporarily storing the information related to the size of the original documents or the record receiving paper, and a counter (PCOUNT) 68 for counting the number of sheets of the original documents or the record receiving paper.

The control circuit 36 further includes a flip-flop 70 which memorizes the information as to whether the facsimile device of the connected office has the administration data storage system of the present invention. If the connected office does not have the administration data storage system, the flip-flop 70 is set. If the connected facsimile device does not have the administration data storage system, the administration information memorized in the respective buffer memories is not required to be sent to the connected office.

Figure 3B:
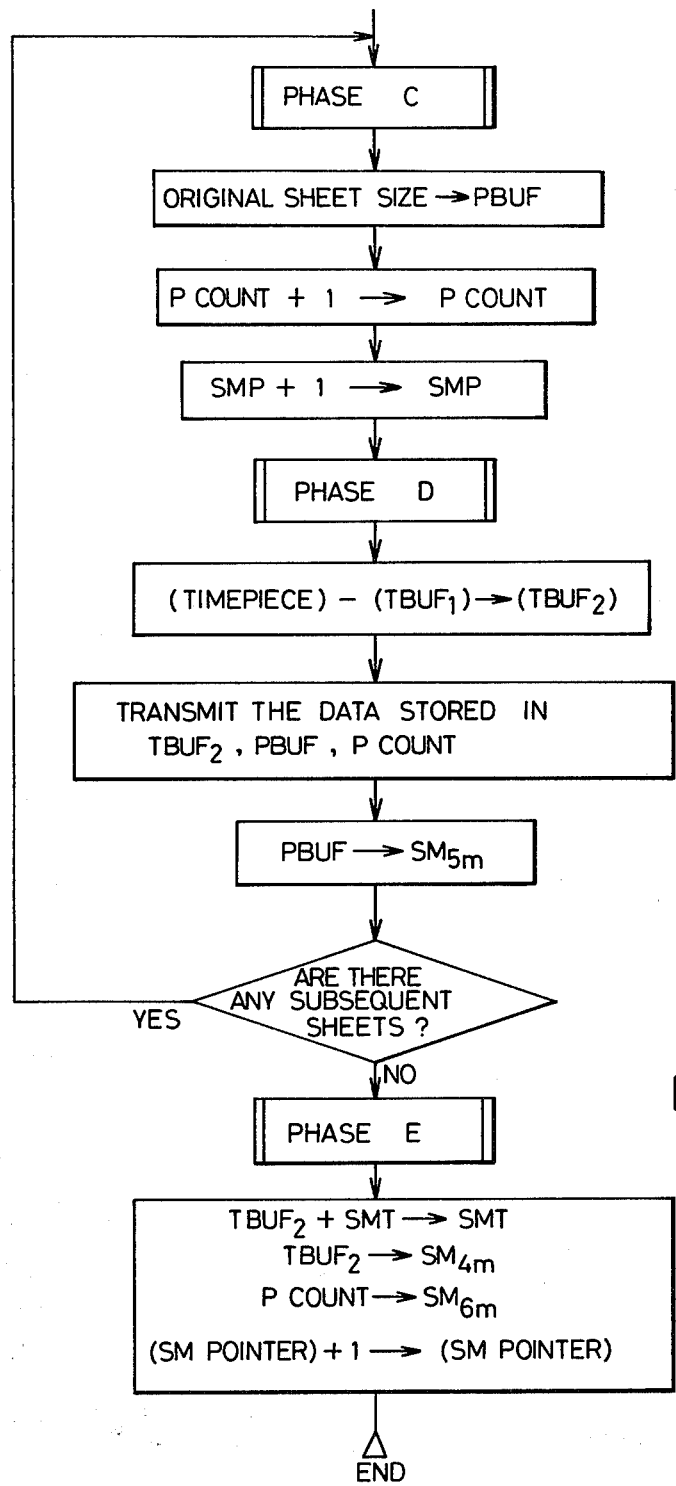

FIG. 3 shows an operation flow of the facsimile system of FIGS. 1 and 2 in the transmitting mode. The operation is mainly controlled by the transmission control circuit 22 which is programmed in accordance with the programs determined by CCITT (International Telegraph and Telephone Consultative Comittee).

The transmitting operation comprises five (5) steps referred to as the phase A through phase E. The phase A is to connect the facsimile devices of the transmitting office and the receiving office with each other through the telephone network. The phase B is to synchronize the system to the receiving office, and determine the functions of the facsimile device of the receiving office.

The phase C is to transmit the coded image data to the receiving office. The phase D is to confirm the messages, and the last phase E is to prepare the system for the next operation.

The above-mentioned phase B is important in the present invention. In the phase B, the receiving ofice transmits the NSF code (Non-Standard Facilities code) signal and the binary code data representing the machine number of the facsimile device of the receiving office to the transmitting office. In response thereto, the transmitting office develops the NSS code (Non-Standard Facilities Set-Up code) signal. Thereafter, the binary code data representing the transmission time at the transmitting office, the department code, the operator code and the machine number is transmitted to the receiving office. In the phase C, after completion of the transmission operation of the image information, the RTC code (Return To Control code) signal is developed. In response to the RTC code signal, the system operation is advanced to the phase D, wherein the information regarding the time period required for the transmission operation, the size and the sheet number of the original documents, and the size and the sheet number of the record receiving paper is transmitted.

More specifically, the operation is controlled in accordance with the program flow shown in FIG. 3 when the facsimile device is placed in the transmitting mode after being connected to the receiving office at the phase A. The transmitting mode is set when the transmitting button included in the keyboard panel 34 is depressed.

First, the current time data stored in the timepiece 38 is applied to the control circuit 36 via the calculation circuit 40. The thus introduced current time data is stored in the buffer memory (TBUF$_1$) 56. Then, the phase B is conducted. When the NSF code signal is developed from the receiving office, the subsequent binary code information is introduced into and stored in the buffer memory (RBUF) 54 of the control circuit 36 through the use of the transmission control circuit 22. The thus stored binary code information is used to determine whether the machine function of the receiving office coincides with that of the transmitting office. If the facsimile devices coincide with each other, the machine number of the receiving office is introduced into and stored in the memory area SM$_{2m}$ in the memory system 42, which is addressed by the SM pointer 52. If the facsimile devices do not coincide with each other, the asterisk code (* *) is transferred to and stored in the memory area SM$_{2m}$.

Then the program is again returned to conduct phase B. After completion of the transmitting operation of the NSS code signal, the binary coded data of the department code preset in the buffer memory (SBUF) 60, the operator code preset in the buffer memory (HBUF) 62, the machine number of the transmitting office preset in the buffer memory (MBUF) 64, and the transmission time stored in the buffer memory (TBUF$_1$) 56 is transferred to the transmission control circuit 22 via the buffer memory (RBUF) 54. Then, the binary coded data regarding the administration information at the transmitting office is transferred to the receiving office. Further, the department code data stored in the buffer memory (SBUF) 60 is introduced into and stored in the memory area SM$_{1m}$ included in the memory system 42. The operator code data stored in the buffer memory (HBUF) 62 is introduced into and stored in the memory area SM$_{7m}$ included in the memory system 42. Further, the time information stored in the buffer memory (TBUF$_1$) 56 is introduced into and stored in the memory area SM$_{3m}$ included in the memory system 42.

Thereafter, the program is advanced to the next phase C, wherein the analog signal representing the document image is transferred from the transmitting office to the receiving office. When the transmitting operation of one sheet of the original documents ia completed, the contents stored in the counter (PCOUNT) 68 are increased by one. The size of the document sheet is detected, and the size data is introduced into and stored in the buffer memory (PBUF) 66. At the same time, the contents in the memory area SMP included in the memory system 42 are increased by one.

Then, the program is advanced to the operation of the next phase D. When the transmitting operation of the original document image data is completed, the calculation circuit 40 functions to obtain the time period required for the transmission through the use of the current time data derived from the timepiece 38 and the time data stored in the buffer memory (TBUF$_1$) 56. The thus obtained time period information is transferred to and stored in the buffer memory (TBUF$_2$) 58 included in the control circuit 36. Thereafter, the time period information stored in the buffer memory (TBUF$_2$) 58, the original sheet size information stored in the buffer memory (PBUF) 66 and the sheet number information stored in the counter (PCOUNT) 68 is transmitted to the receiving office through the transmission control circuit 22. Further, the original sheet size information stored in the buffer memory (PBUF) 66 is transferred to and stored in the memory area SM$_{5m}$ included in the memory system 42.

If the existence of at least one subsequent original sheet is detected, the program is returned to the above-mentioned phase C. The transmitting office develops the control signal for indicating the existence of the subsequent sheet to the receiving office. When the present document sheet has a different size than the preceding document sheet, the document size information stored in the buffer memory (PBUF) 66 is updated. The new size information is transferred to and stored in the memory area SM$_{5m}$ of the memory system 42.

When the entire document sheets have been transmitted, the program is advanced to the last phase E. The subtotal time period stored in the buffer memory (TBUF$_2$) 58 is introduced into the calculation circuit 40. The calculation circuit 40 functions to add the time period data derived from the buffer memory (TBUF$_2$) 58 to the time period data stored in the memory area SMT of the memory circuit 42. The thus updated time period data is introduced into and stored in the memory area SMT. The time period data stored in the buffer memory (TBUF$_2$) 58 is transferred to and stored in the memory area SM$_{4m}$ in the memory system 42. Further, the sheet number data stored in the counter (PCOUNT) 68 is transferred to and stored in the memory area SM$_{6m}$ included in the memory system 42.

In this way, the total memory areas SMT and SMP of the memory system 42 are updated. The respective transmission data is stored in the memory areas SM$_{1m}$ through SM$_{7m}$. After completion of the above-mentioned update operation and the memorizing operation, the contents stored in the SM pointer 52 are increased by one. Then, the facsimile device is disconnected from the telephone network, and the main power supply is terminated. However, the memory system 42, the timepiece 38, the SM pointer 52 and the RM pointer 50 are supplied with power from the battery to keep the information stored therein.

Figure 4B:
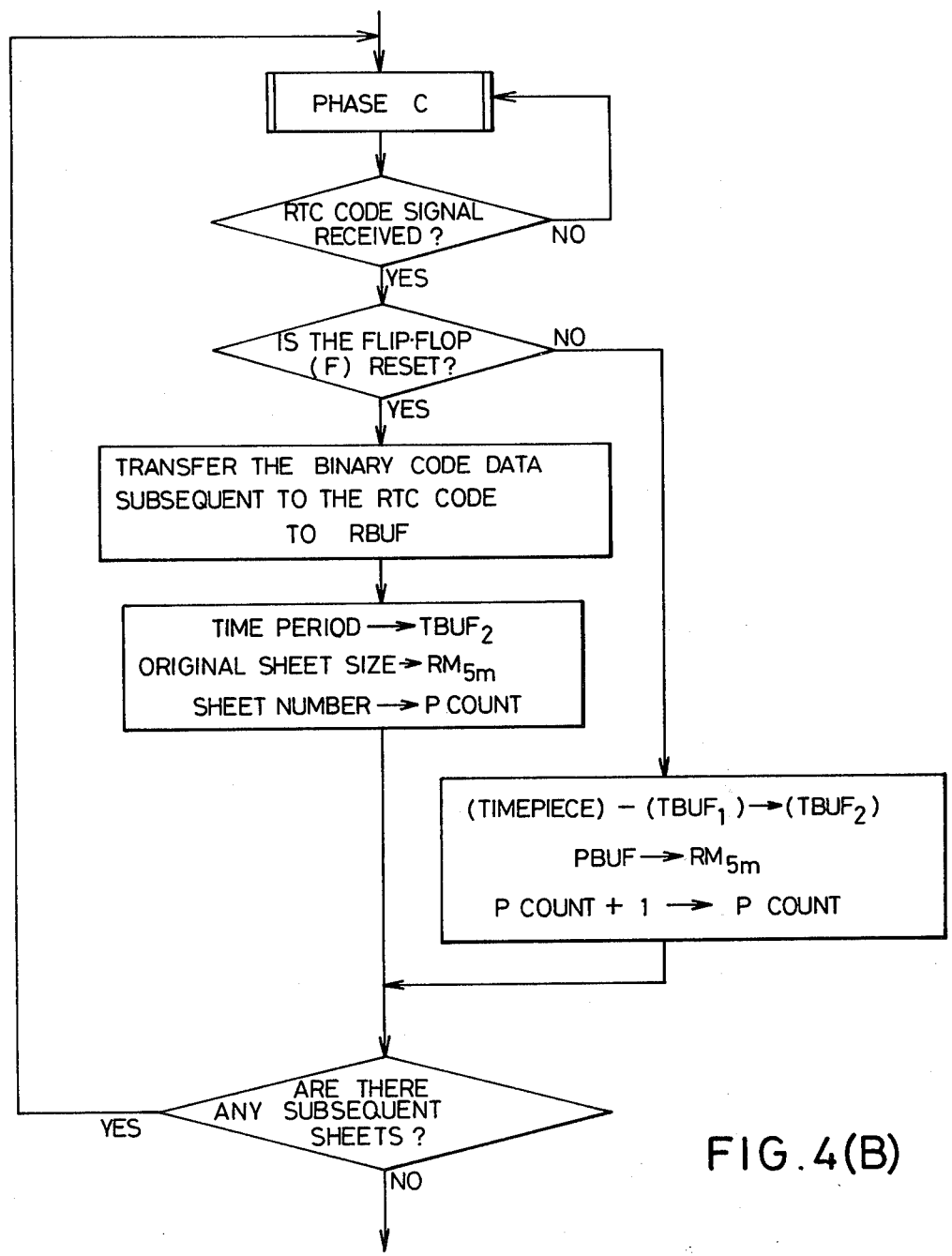
Figure 4C:
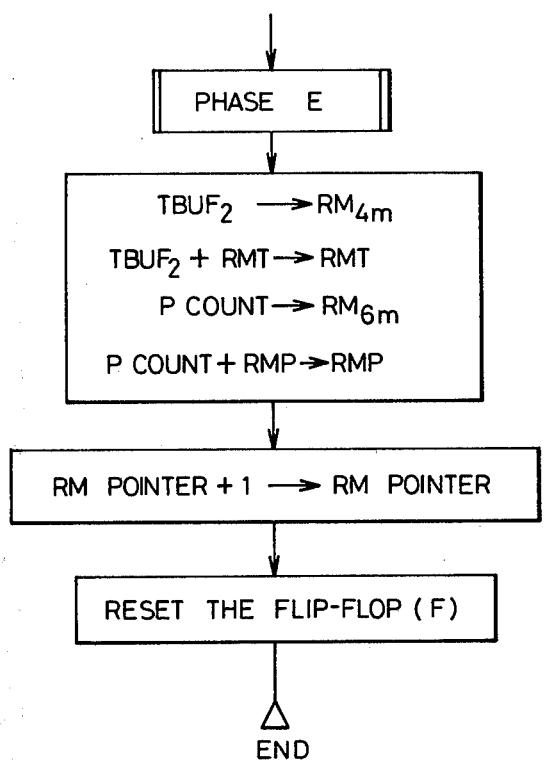

FIG. 4 shows an operation flow of the facsimile system of FIGS. 1 and 2 in the receiving mode. The facsimile system is placed in the receiving mode when the receiving mode button included in the keyboard panel 34 is depressed. The NSF code signal is transmitted from the receiving office to the transmitting office after the current time data is introduced into the buffer memory (TBUF$_1$) 56.

The binary code data representing the machine number stored in the buffer memory (MBUF) 64 is transmitted to the transmitting office via the transmission control circuit 22.

When the NSS code signal is transmitted from the transmitting office in the phase B, the subsequent information is introduced into and stored in the buffer memory (RBUF) 54. The thus introduced information is examined to determine whether the facsimile device of the transmitting office has the same ability as that of the receiving office. If a coincidence is detected, the information stored in the buffer memory (RBUF) 54, which represents the department code of the transmitting office, the machine number of the facsimile device of the transmitting office, the transmission time and the operator code, is introduced into and stored in the memory areas RM$_{1m}$, RM$_{2m}$, RM$_{3m}$ and RM$_{7m}$ included in the memory system 42, respectively.

If no coincidence is detected, the flip-flop (F) 70 is set. The asterisk code (* *) is introduced into and stored in the memory areas RM$_{1m}$, RM$_{2m}$ and RM$_{7m}$. Further, the current time data stored in the buffer memory (TBUF$_1$) 56 is introduced into and stored in the memory area RM$_{3m}$.

That is, when the facsimile device of the transmitting office has the same abilities, namely, the administration data storage system, priority is assigned to the time data transmitted from the transmitting office. When the facsimile device of the transmitting office does not have the administration data storage system, the time data derived from the timepiece 38 in the receiving office is used.

Thereafter, the image data transmitted from the transmitting office is applied to the recording device 32 at the phase C to record the image on the record receiving paper. After completion of the transmission operation of the image data, the RTC code signal is transmitted from the transmitting office. In response thereto, if the flip-flop (F) 70 is in the reset state, the subsequent binary code data transmitted from the transmitting office is introduced into the buffer memory (RBUF) 54. Then, the time period data transmitted from the transmitting office is introduced into and stored in the buffer memory (TBUF$_2$) 58. The original sheet size data transmitted from the transmitting office is introduced into and stored in the memory area RM$_{5m}$, and the sheet number data transmitted from the transmitting office is introduced into and stored in the counter (PCOUNT) 68.

If the flip-flop (F) 70 is in the set state, the current time information derived from the timepiece 38 and the time data stored in the buffer memory (TBUF$_1$) are introduced into the calculation circuit 40 in order to obtain the time period required for the data transmission. The thus calculated time priod data is introduced into and stored in the buffer memory (TBUF$_2$) 58. The sheet size information of the record receiving paper which has been preset in the buffer memory (PBUF) 66 is transferred to and stored in the memory area RM$_{5m}$ included in the memory system 42. When the signal indicating the existence of at least one subsequent sheet is transmitted from the transmitting office, the program is returned to execute the operation of the phase C after increasing the contents stored in the counter (PCOUNT) 68 by one.

When the transmission of all sheets of the documents is completed, the program is advanced to the last phase E. The time period data stored in the buffer memory (TBUF$_2$) is introduced into and stored in the memory area RM$_{4m}$ included in the memory system 42. The sheet number information stored in the counter (PCOUNT) 70 is introduced into and stored in the memory area RM$_{6m}$.

The total memory areas RMT and RMP are updated in accordance with the data stored in the buffer memory (TBUF$_2$) 58 and the counter (PCOUNT) 68, respectively. The contents stored in the RM pointer 50 are increased by one, and the flip-flop (F) 70 is reset. Then, the facsimile device is disconnected from the telephone network, and the main power supply is terminated. However, the timepiece 38, the memory system 42, the SM pointer 52 and the RM pointer 50 are supplied with power from the battery to keep the information stored therein.

At the end of the one day work, the print instruction key included in the keyboard panel 34 is actuated to read out the information stored in the memory system 42. In response to the actuation of the print instruction key, the information memorized in the memory system 42 is sequentially applied to the buffer memory 46. The information temporarily stored in the buffer memory 46 is applied to the character generator 44 which develops the print control signal to the recording device 32.

Figure 5:
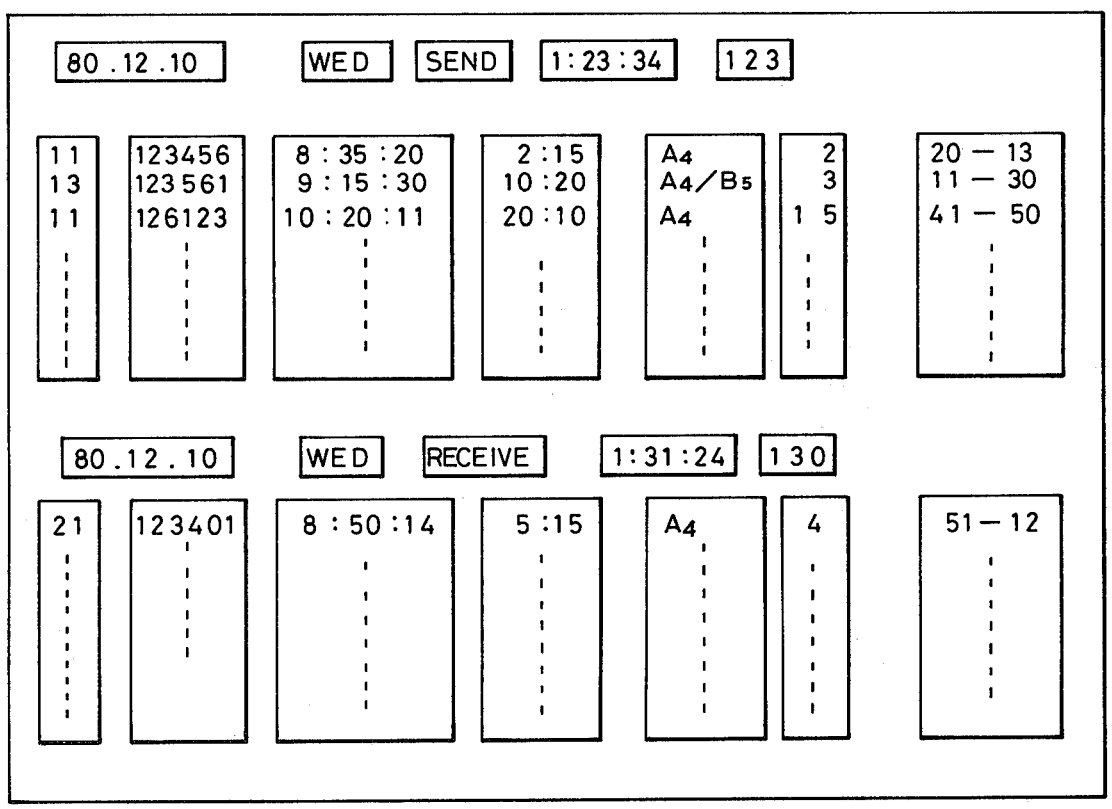
FIG. 5 is a schematic plan view showing an example of a printout of the administration information in the facsimile system of FIG. 1.

FIG. 5 shows an example of the printout of the information memorized in the memory system 42.

The printout of FIG. 5 is divided into two sections. The upper section shows the administration information related to the transmitting operation. The lower section shows the administration information related to the receiving operation. The printed out information includes the data related to date (Dec. 10, 1980), day (Wednesday), a symbol SEND for indicating the fact that the upper section shows the administration data related to the transmitting operation, the total time period required for the transmitting operation (one hour, twenty-three minutes and thirty-four seconds), the total sheet number of the original documents being transmitted (123 sheets), and the respective data stored in the memory areas SM$_{1m}$ through SM$_{7m}$. More specifically, the printed out information includes the data (11, 13, - -) related to the department code of the receiving office, the data (123456, 123561, - - - ) related to the machine number of the facsimile device of the receiving office, the data (8:35:20 (eight thirty-five and twenty seconds), 9:15:30, - - - ) related to the time of the initiation of the transmitting operation, the data (2:15 (two minutes and fifteen seconds), 10:20, - - - ) related to the time period required for the transmitting operation, the data (A$_4$, A$_4$/B$_5$, - - - ) related to the size of the original document sheet, the data (2, 3, - - - ) related to the sheet number of the original documents, and the operator code (20-13, 11-30, - - - ) representing the operator who conducted the transmitting operation. The information related to the receiving operation is also printed out in a same manner at the lower section.

Figure 6:
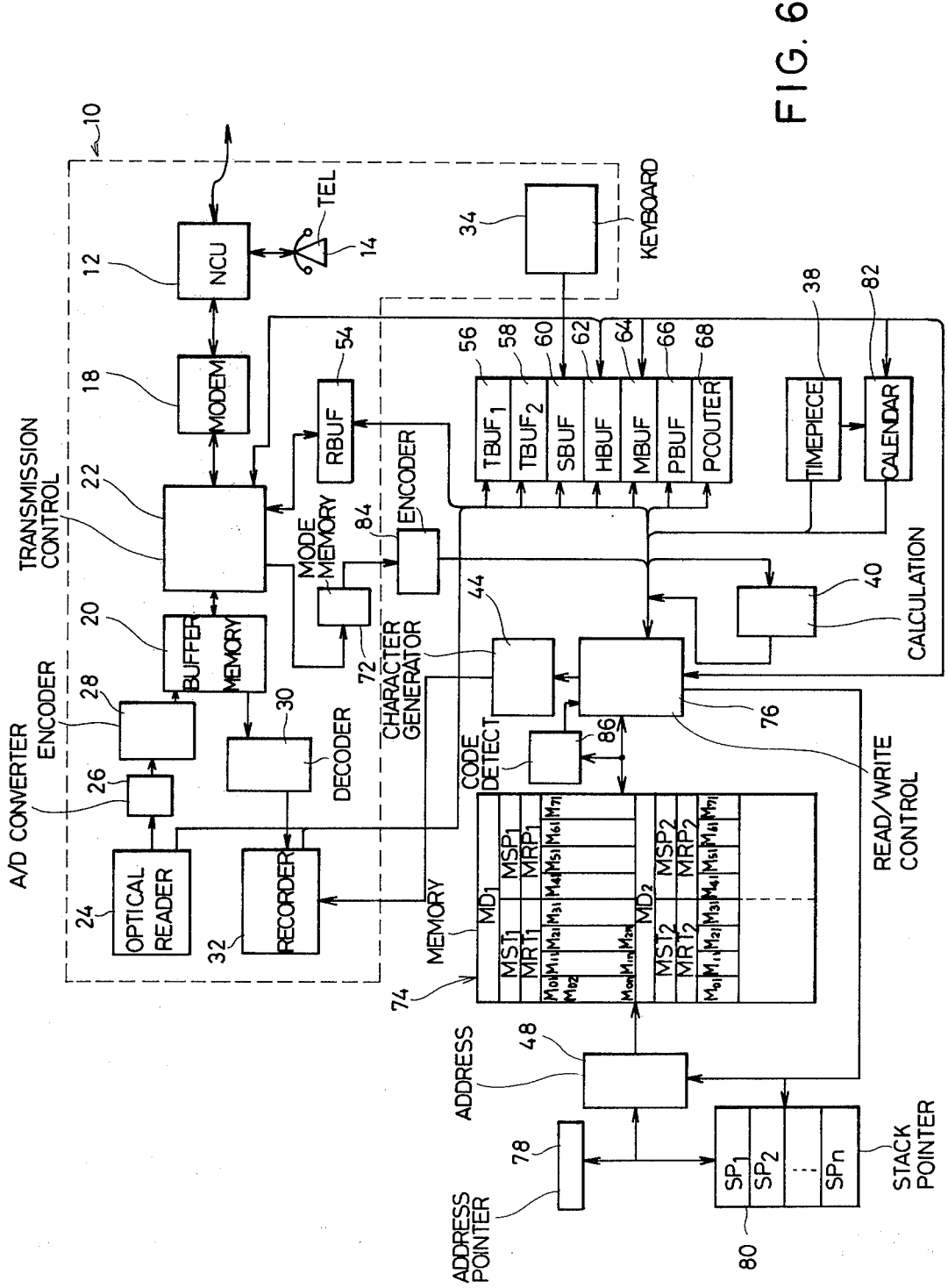
FIG. 6 is a block diagram of another embodiment of a facsimile system of the present invention.

FIG. 6 shows another embodiment of the facsimile system of the present invention. Like elements corresponding to those of FIGS. 1 and 2 are indicated by like numerals.

The embodiment of FIG. 6 includes a mode memory circuit 72 which memorizes the transmission mode or the receiving mode selected by the transmission control circuit 22. A memory system 74 of this embodiment is connected to a read/write control circuit 76 and the address circuit 48. The address circuit 48 is responsible to the contents stored in an address pointer 78 and a stack pointer 80 which stores the first addresses of each day. In a preferred form, at the initiation of one day of work, the contents stored in the address pointer 78 are determined to a desired value in response to the contents stored in any one of the memory sections ($SP_1$ through $SP_n$) included in the stack pointer 80. In another preferred form, at the end of one day of work, the contents stored in the address pointer 78 are transferred to a corresponding memory section ($SP_m$) in the stack pointer 80. The address circuit 48 functions to address the memory section in the memory system 74 in accordance with the contents stored in the address pointer 78. A calendar circuit 82 is provided for storing the calendar data which is updated in response to the date signal developed froom the timepiece 38.

The memory system 74 of this embodiment stores the administration information of plural days. The memory system 74 includes memory areas $MD_1$, $MD_2$, - - -, $MD_n$ for storing the information related to the date data and the day data, which are located at the initial section of each date information. The memory area $MST_m$ stores the total time of one day required for the transmitting operation, the memory area $MRT_m$ stores the total time of one day required for the receiving operation, the memory area $MSP_m$ stores the total sheet number of the documents sent in one day, and the memory area $MRP_m$ stores the total sheet number of the recording paper used in a day. The memory areas $M_{01}$–$M_{0n}$ through $M_{71}$–$M_{7n}$ store the information related to the each transmission operation. More specifically, the memory area $M_{0m}$ stores the coded information representing the transmitting operation or the receiving operation, the memory area $M_{1m}$ stores the information related to the department which send the documents, the memory area $M_{2m}$ stores the machine number of the facsimile device of the opposing office, the memory area $M_{3m}$ stores the time information at which the transmission operation is initiated, the memory area $M_{4m}$ stores the information related to the time period required for the transmission, the memory area $M_{5m}$ stores the information related to the size of the documents or the record receiving paper, the memory area $M_{6m}$ stores the information related to the sheet number of the documents or the record receiving paper, and the memory area $M_{7m}$ stores the operator code of the transmitting office and the receiving office.

The mode information stored in the mode memory circuit 72 is applied to an encoder 84 which develops the coded information to be stored in the memory area $M_{0m}$. A code detection circuit 86 is disposed between the memory system 74 and the read/write control circuit 76 for determining the fact as to whether the now read out information relates to the administration data of the transmitting operation or the receiving operation.

Figure 7A:
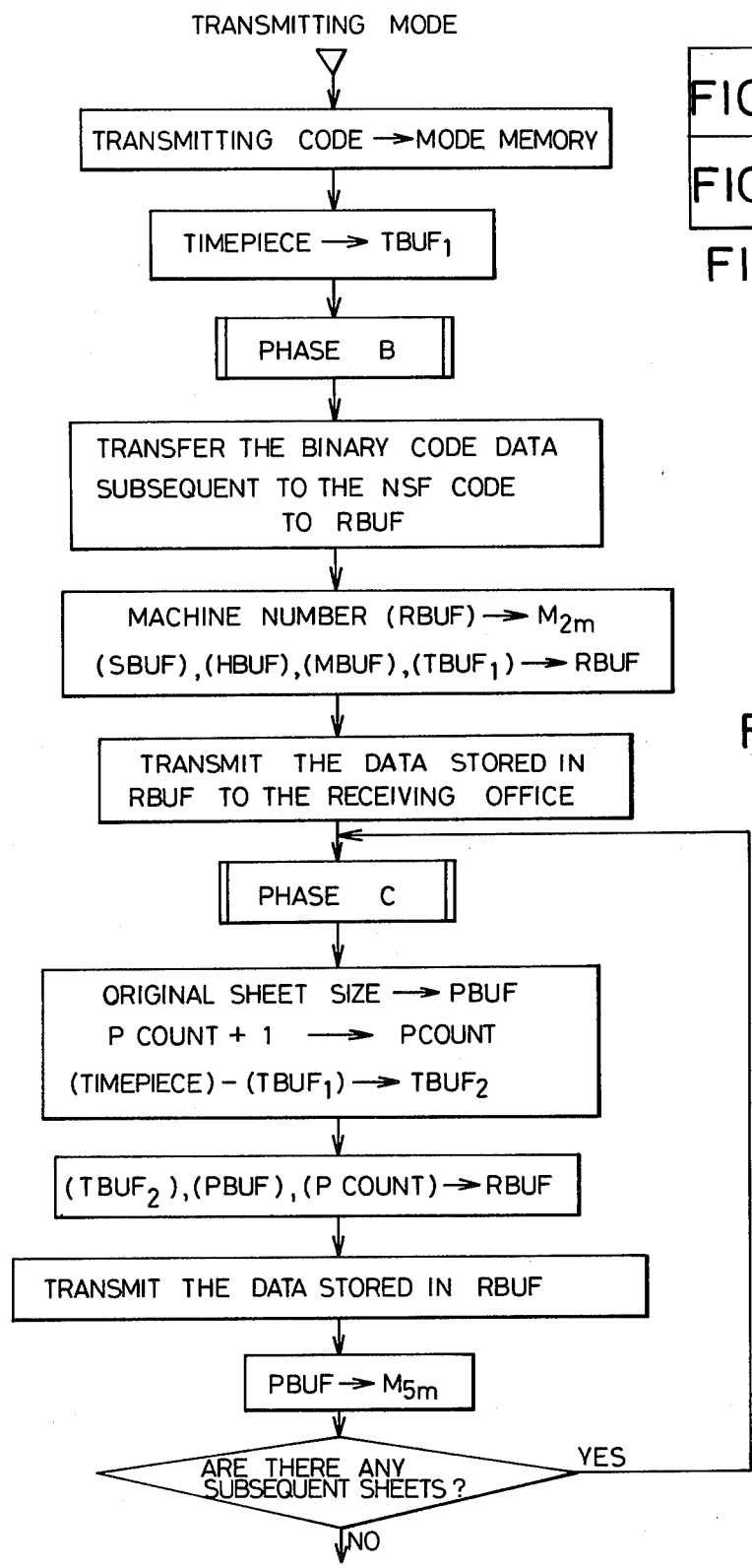
FIGS. 7A and 7B is a flow chart for explaining an operation of the facsimile system of FIG. 6 in a transmitting mode.
Figure 7B:
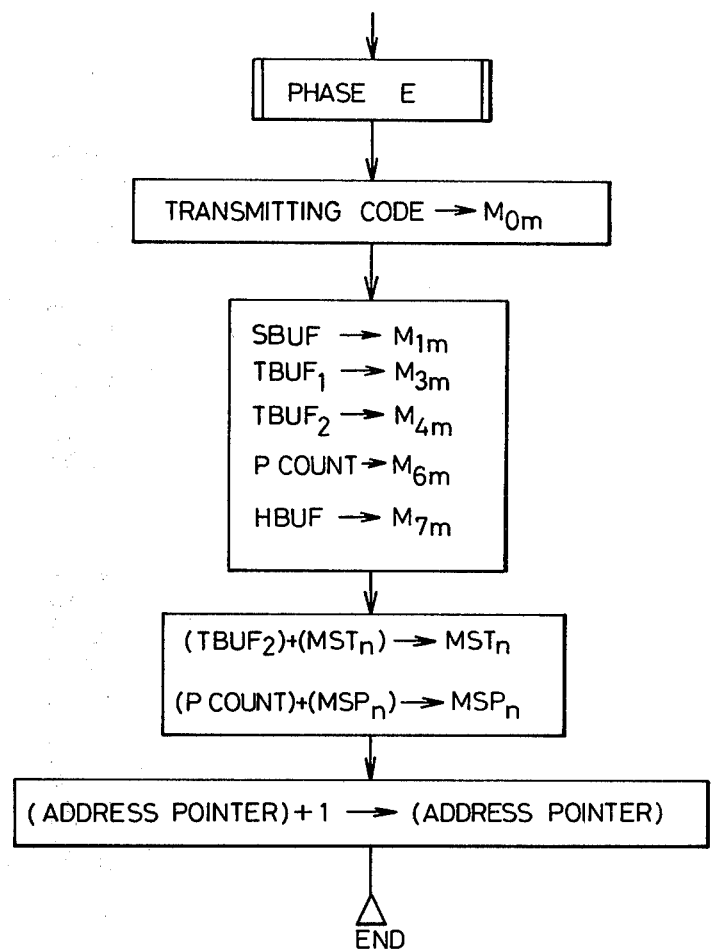

FIG. 7 shows an operation flow of the facsimile system of FIG. 6 in the transmitting mode. The explanation will be limited to the steps which are different from those of FIG. 3 for the purpose of simplicity.

At the beginning the transmitting operation, the code signal representing the transmitting mode is introduced into and stored in the mode memory 72. The machine number data of the receiving office is introduced into and stored in the memory area $M_{2m}$. Then, the NSS code signal is transmitted to the receiving office and, thereafter, the department code, the operator code, the machine number information and the time information stored in the buffer memory ($TBUF_1$) 56 are transmitted to the receiving office via the buffer memory (RBUF) 54 and the transmission control circuit 22.

At the end of the document data transmission operation, the document size information stored in the buffer memory (PBUF) 66 is introduced into and stored in the memory area $M_{5m}$. When the transmission operation of the entire documents is completed, the operation is advanced to the phase E. The coded information representing the transmitting mode is introduced into and stored in the memory area $M_{0m}$. The department code stored in the buffer memory (SBUF) 60 is introduced into and stored in the memory area $M_{1m}$. The transmission initiating time stored in the buffer memory ($TBUF_1$) 56 is introduced into and stored in the memory area $M_{3m}$. The time period data stored in the buffer memory ($TBUF_2$) 58 is introduced into and stored in the memory area $M_{4m}$. The sheet number information stored in the counter (PCOUNT) 68 is introduced into and stored in the memory area $M_{6m}$, and the operator code stored in the buffer memory (HBUF) 62 is introduced into and stored in the memory area $M_{7m}$. Then, the contents stored in the total memory areas $MST_n$ and $MSP_n$ are updated in accordance with the information stored in the buffer memory ($TBUF_2$) 58 and the counter (PCOUNT) 68, respectively. At the end of the operation, the contents stored in the address pointer 78 are increased by one in order to address the next address $M_{0m+1}$ through $M_{7m+1}$ in the next transmission operation. Thereafter, the system is disconnected from the telephone network, and the main power supply is terminated. However, the memory system 74, the address pointer 78, the stack pointer 80, the read/write control circuit 76, the timepiece 38 and the calendar circuit 82 are continuously supplied with power from the battery to keep the information stored therein.

Figure 8A:
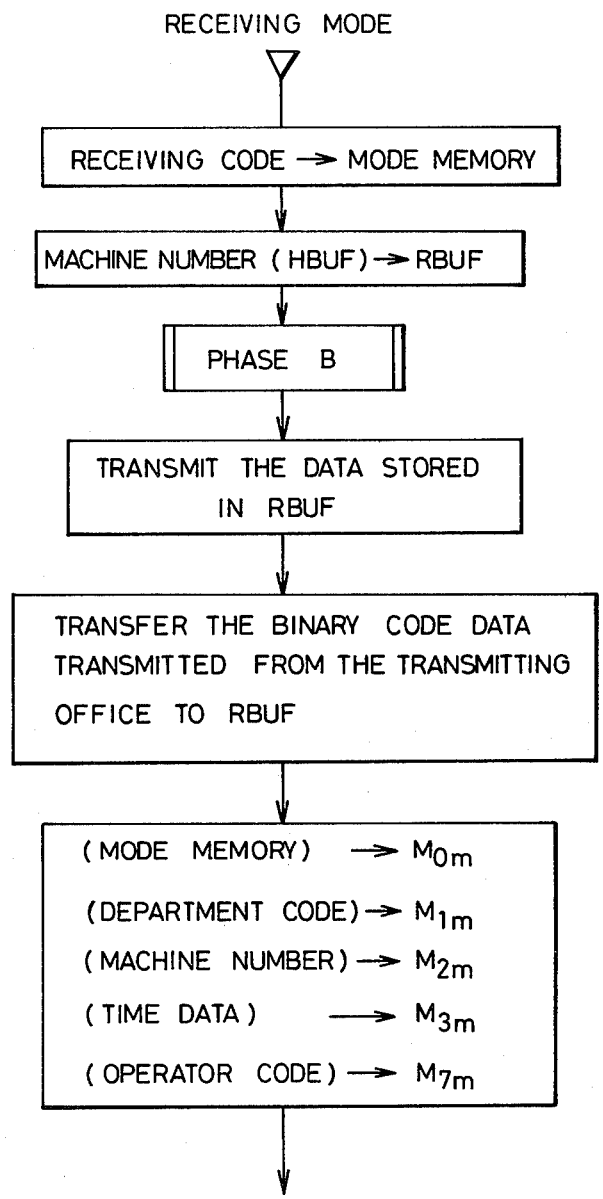
FIGS. 8A and 8B is a flow chart for explaining an operation of the facsimile system of FIG. 6 in a receiving mode.
Figure 8B:
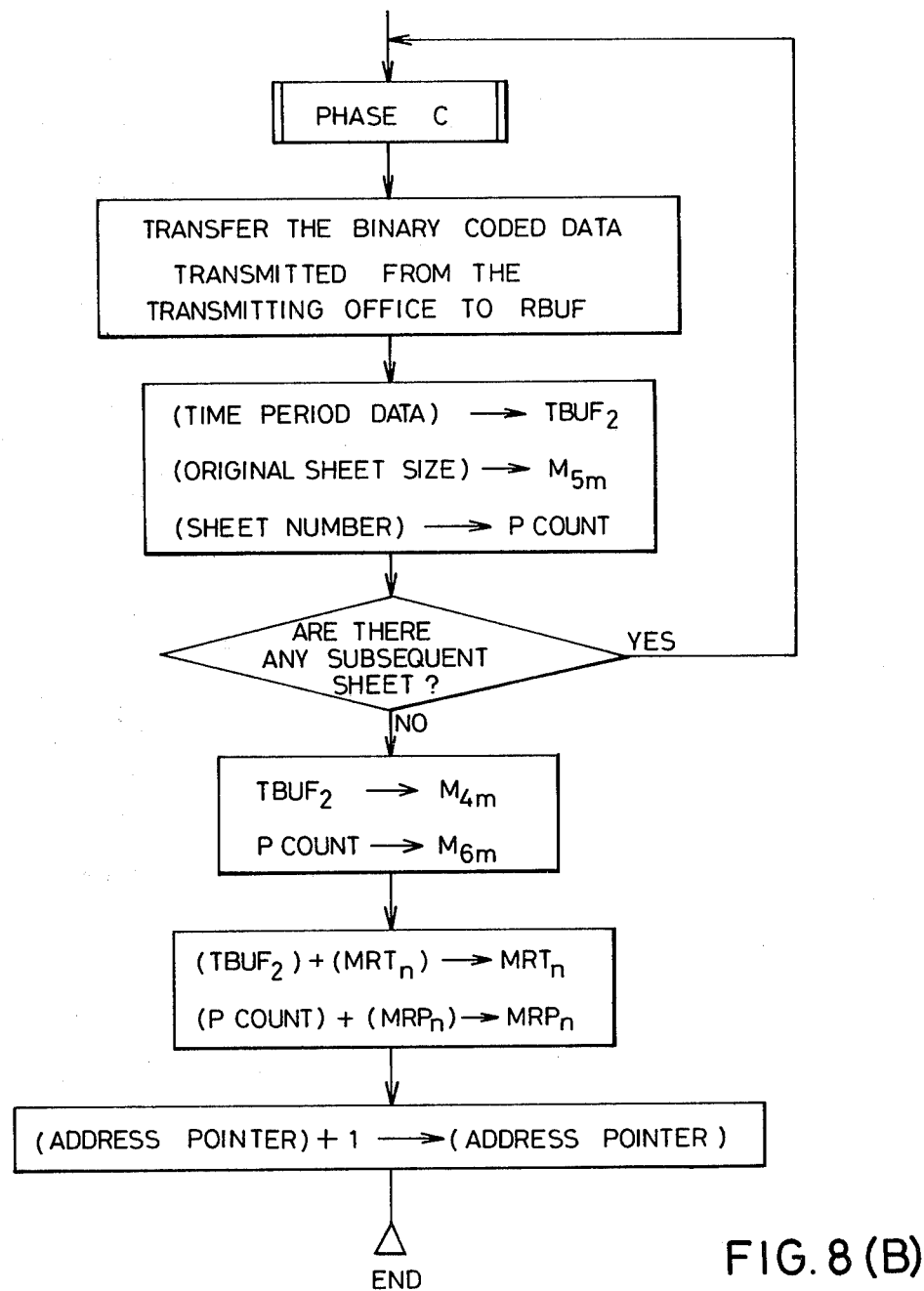

FIG. 8 shows an operation flow of the facsimile system of FIG. 6 in the receiving mode. The explanation will be limited to the steps which are different from those of FIG. 4 for the purpose of simplicity.

The transmission control circuit 22 develops a control signal to set the receiving mode signal in the mode memory circuit 72. The system develops the NSF code signal to be transmitted to the transmitting office. Then, the machine number which has been preset in the buffer memory (MBUF) 64 is transferred to the buffer memory (RBUF) 54, and the machine number information is transmitted to the transmitting office. In response to the NSS code signal transmitted from the transmitting office, the subsequent data is introduced into the buffer memory (RBUF) 54 through the transmission control circuit 22. The system detects whether the facsimile device at the transmitting office has the same ability, that is, the administration data storage system. If the transmitting office has the same ability, the department code information, the machine number information, the transmission time information and the operator code information transmitted from the transmitting office are introduced into and stored in the corresponding memory areas $M_{im}$.

The mode signal representing the receiving mode, which is memorized in the mode memory circuit 72, is applied to the encoder 84, and the coded data is introduced into and stored in the memory area $M_{0m}$ which is addressed by the address circuit 48 in accordance with the contents stored in the address pointer 78.

At the end of the document transmission operation, the RTC code signal is transmitted from the transmitting office. The binary coded data subsequent to the RTC code signal is introduced into the buffer memory (RBUF) 54. Then, the time period data transmitted from the transmitting office is transferred to the buffer memory (TBUF$_2$) 58. The original sheet size data transmitted from the transmitting office is introduced into and stored in the memory area $M_{5m}$. The sheet number data is also transferred to the counter (PCOUNT) 68. If the additional sheets exist, the operation of the phase C is repeated.

When the transmission operation of the entire document sheets is completed, the time period data stored in the buffer memory (TBUF$_2$) 58 is transferred to the memory area $M_{4m}$. The sheet number data stored in the counter (PCOUNT) 68 is introduced into and stored in the memory area $M_{6m}$. At the same time, the total data stored in the memory areas $MRT_n$ and $MRP_n$ are updated. Then, the contents stored in the address pointer 78 are increased by one.

Figure 9:
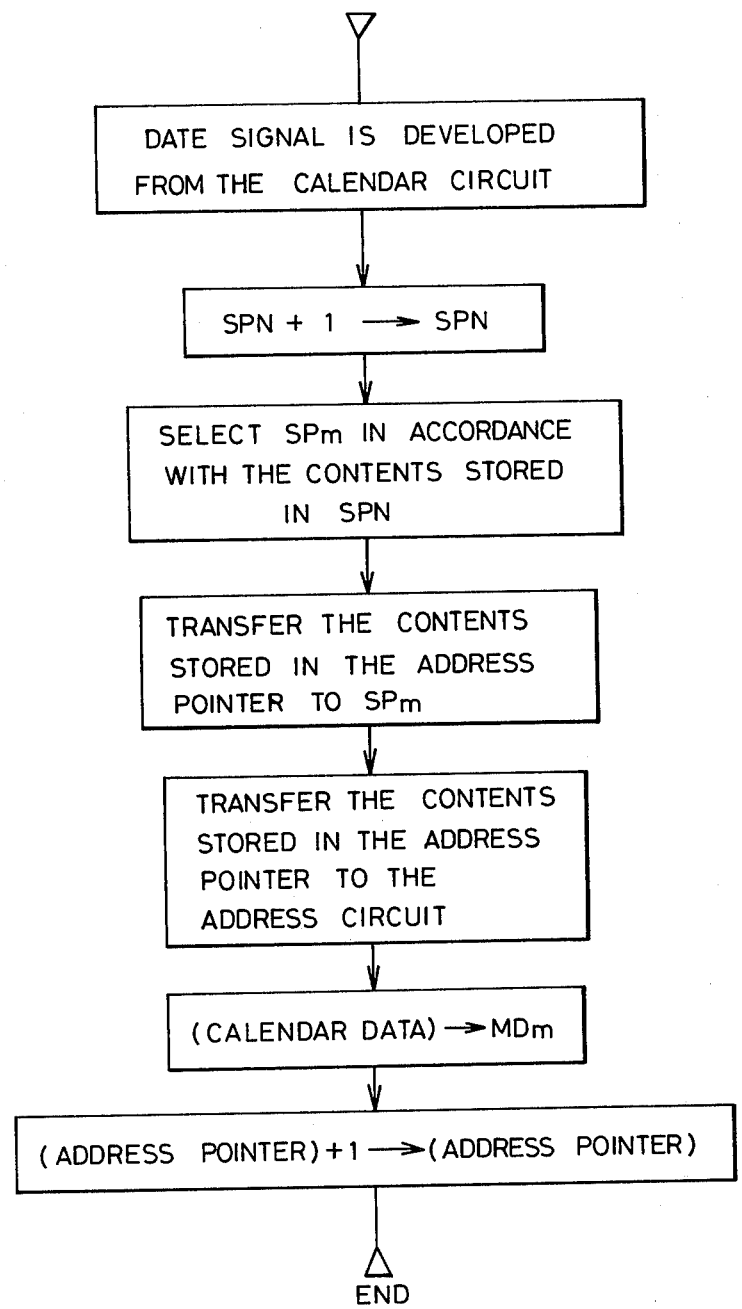
FIG. 9 is a flow chart for explaining a calendar operation in the facsimile system of FIG. 6.

When the one day of work is completed, the print instruction key included in the keyboard panel 34 is actuated to print out the administration data stored in the memory system 74. In the embodiment of FIG. 6, the date update operation is conducted at the end of one day. The stack pointer 80 stores the data representing the first address of one day at a preselected memory section $SP_m$. The read/write control circuit 76 includes a counter SPN which is responsible to the date signal derived from the calendar circuit 82. The counter SPN functions to select one of the memory sections $SP_m$ in the stack pointer 80. FIG. 9 shows an operation flow related to the data control of the stack pointer 80. The contents stored in the counter SPN are used to address a corresponding memory area $SP_m$ included in the stack pointer 80. Then, the contents stored in the address pointer 78 are introduced into and stored in the thus addressed memory area $SP_m$ of the stack pointer 80. Accordingly, the memory area $SP_m$ of the stack pointer 80 stores the first address of each day.

Then, the contents stored in the address pointer 78 are applied to the address circuit 48 in order to select the memory area $MD_m$ to which the calendar data should be introduced from the calendar circuit 82. Therefore, in the embodiment of FIG. 6, the print out operation of the memorized administration data is not necessarily conducted at the end of each day.

Figure 10:
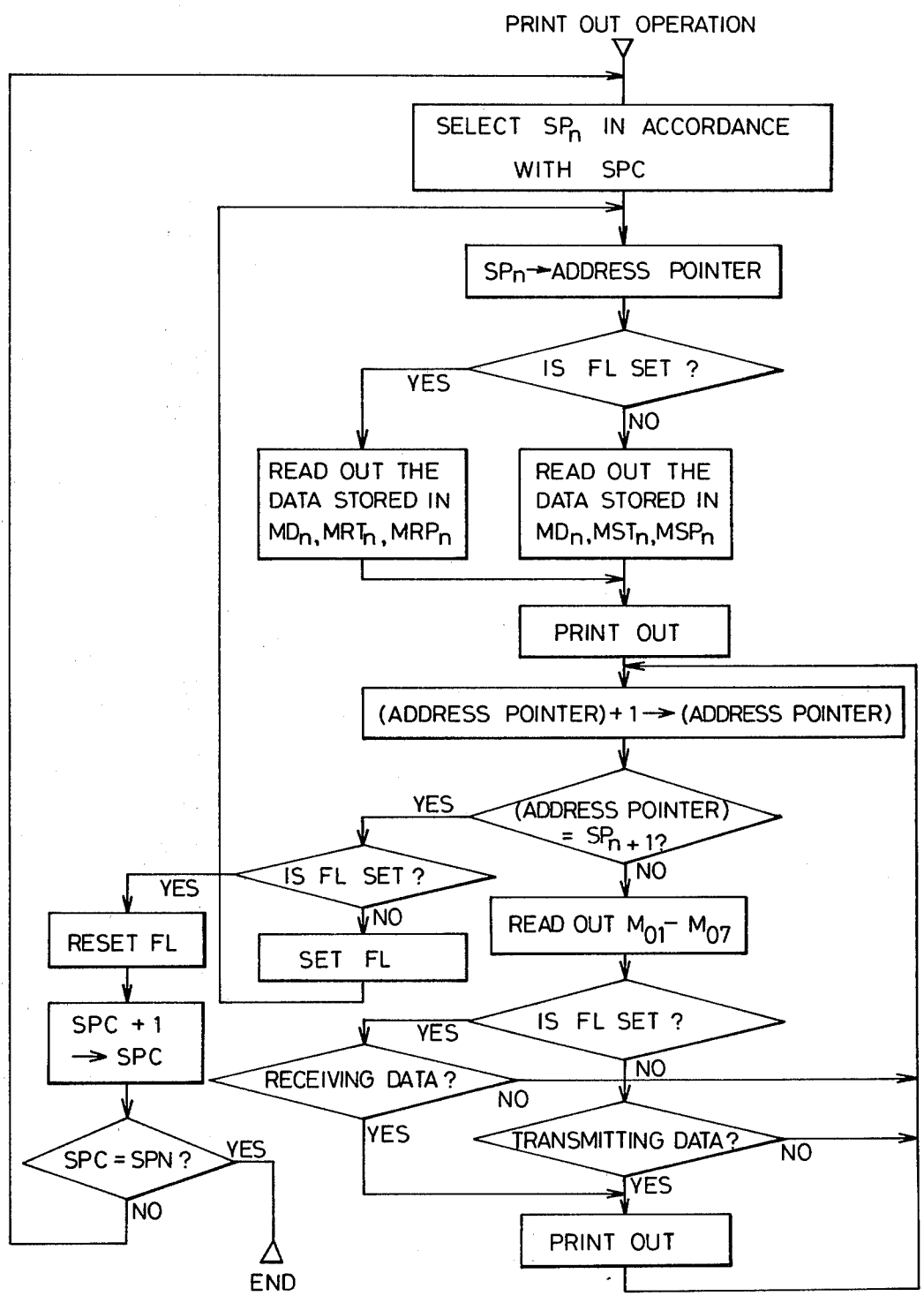
FIG. 10 is a flow chart for explaining a printing operation of the administration information conducted by the facsimile system of FIG. 6.

FIG. 10 shows an operation flow of the facsimile system of FIG. 6 in the print out mode. The read/write control circuit 76 includes a counter SPC which counts every print out operation of the administration data stored in the memory system 74. The counter SPC is normally placed in the reset mode to address the first pointer SP$_1$ included in the stack pointer 80. Under these conditions, when the print instruction key included in the keyboard panel 34 is actuated, the first pointer SP$_1$ included in the stack pointer 80 is selected to read out the address information stored in the pointer SP$_1$. The thus read out address information is transferred to and stored in the address pointer 78.

The read/write control circuit 76 includes a flip-flop FL which indicates the fact whether the data relates to the transmitting operation or the receiving operation.

When the flip-flop FL is in the reset state, the date information, the time period data of the transmitting operation and the original sheet number stored in the memory areas MD$_1$, MST$_1$ and MSP$_1$ are read out. The thus read out data is applied to the character generator 44 to print out the information. Then, the contents stored in the address pointer 78 are increased by one. The thus obtained address data is compared with the contents stored in the second pointer SP$_2$. If the coincide is not detected, the contents stored in the memory areas $M_{01}$ through $M_{71}$ are read out. Since the flip-flop FL is in the reset state, the contents stored in the memory area $M_{01}$ is checked to determine whether the information relates to the transmitting operation at the code detection circuit 86. When the information relates to the transmitting operation, the read out information is applied to the character generator 44 to print out the information. When the information relates to the receiving operation, the information is not applied to the character generator 44. Then, the contents stored in the address pointer 78 are increased by one to read out the next information. In this way, the administration data is printed out as shown in the upper section of FIG. 5.

When the contents stored in the address pointer 78 reach the contents stored in the pointer SP$_2$ included in the stack pointer 80, the flip-flop FL is changed to the set state to read out the administration data related to the receiving operation. The first pointer SP$_1$ is again selected by the counter SPC, and the address information stored in the first pointer SP$_1$ is transferred to the address pointer 78. Since the flip-flop FL is in the set state, the information stored in the memory areas MD$_1$, MRT$_1$ and MRP$_1$ is read out to print the calendar information, the total time period required for the receiving operation, and the total sheet number. Since the flip-flop FL is in the set state, the determination operation as to whether the data relates to the receiving opetaion is conducted through the use of the contents stored in the memory area $M_{0m}$. In this way, the administration operation related to the receiving operation is printed out as shown in the lower section of FIG. 5.

When the print out operation of the one day information is completed, the contents stored in the address pointer 78 reach the contents stored in the second pointer SP$_2$ included in the stack pointer 80. At this moment, the flip-flop FL is in the set state. Therefore, the flip-flop FL is changed to the reset state, and the contents stored in the counter SPC included in the read/write control circuit 76 are increased by one to select the second pointer SP$_2$. When the contents stored in the counter SPC reach the contents stored in the counter SPN, the read out operation is completed. This is because the counter SPN stores the pointer number $SP_m$ which stores the first address information of each day. It is preferable that the memorized information stored in the memory system 74, the address pointer 78, the stack pointer 80 and the counters SPC and SPN is cleared when the print out operation is completed.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An administration data storage system in a facsimile system which transmits image data from a transmitting office to a receiving office, and records an image through the use of a recording device in accordance with the image data transmitted from the transmitting office and received by the receiving office, said administration data storage comprising:

transfer means for bidirectionally transmitting administration data between the transmitting office and the receiving office;

memory means for storing the administration data related to each transmission operation;

said memory means including, first memory section means for storing administration data accumulated during data transmittal; and, second memory section means for storing administration data accumulated during data receipt; and;

print out means for printing out said administration data stored in said memory means;

said administration data stored in said first memory section means being printed separately from the administration data stored in said second memory section means.

2. The administration data storage system of claim 1, wherein said print out means includes said recording device for recording the image transmitted from the transmitting office.

3. The administration data storage system of claim 1 or 2, each of said first and second memory section means comprising:

a first memory area for storing a time data at which the transmission operation is initiated;

a second memory area for storing a time period data during which the transmission operation is conducted;

a third memory area for storing a document size data representing the size of a document sheet;

a fourth memory area for storing a sheet number data representing the number of sheet of the original documents; and a fifth memory area for storing a machine number of a facsimile device of the transmitting office or the receiving office.

4. The administration data storage system of claim 3, wherein said memory means is further divided into plural memory subsections each of which stores the administration data of one day.

5. The administration data storage system of claim 4, wherein said print out means includes a read out control system for reading out the administration data stored in said plural memory subsections of said memory means.

6. A facsimile apparatus for transmitting data to and receiving data from other facsimile devices through a telephone circuit, said apparatus comprising:

optical monitoring means for optically reading an image and for producing transmission signals therefrom when said facsimile apparatus is in a transmit mode;

optical image generation means responsive to the transmission signals of another facsimile device for recording said transmission when said facsimile apparatus is in a receive mode;

network control means for interfacing said facsimile apparatus with the telephone circuit;

administration data generation means for producing administration data;

transfer means operatively interconnected to said network control means for generating administration data signals from said administrative data when in the transmit mode and for receiving administration data signals when in the receive mode;

memory means for storing administration data related to each transmission to, or receipt of data from another facsimile device, said memory means including a first memory section means for storing administration data accumulated during the transmit mode and a second memory section means for storing administration data accumulated during the receipt mode;

said network control means transmitting both said transmission data and said administration data when in said transmit mode and receiving both said data from the telephone circuit in said receipt mode; and means responsive to said memory means for displaying said administration data when desired, said administration data accumulated during said transmit mode being displayed separately for said administration data accumulated during said receipt mode.

7. The apparatus of claim 6 further comprising transmitting device type evaluation means for determining the type of said device transmitting said transmission signal when said apparatus is in the receipt mode and producing an administration data generation signal when said transmitting device is not of a type which generates administration data;

said transfer means storing said administration data generated by said administration data generation means when in said receipt mode when said administration data generation signal is produced by said transmitting device type evaluation means.

8. The apparatus of claim 7 wherein said administration data comprises time data, department data, machine number data and time period data.

9. The apparatus of claim 8 further comprising calculation means responsive to said network control means for calculation of the time period for transmission of said transmission data and producing time period data therefrom.

10. The device of claim 9 wherein said memory means accumulates said administration data for each work day in a separate memory area, said memory means storing information relating to more than one work day.

* * * * *